United States Patent [19]

Wagner, Jr. et al.

[11] Patent Number: 4,564,559

[45] Date of Patent: Jan. 14, 1986

[54] ORIENTED MULTI-LAYER HEAT SEALABLE FILM

[75] Inventors: John R. Wagner, Jr., Rochester; Melvil B. Clauson, Newark, both of N.Y.

[73] Assignee: Mobil Oil Corporation, New York, N.Y.

[21] Appl. No.: 687,417

[22] Filed: Dec. 28, 1984

[51] Int. Cl.<sup>4</sup> ............................................. B32B 27/00
[52] U.S. Cl. ..................................... 428/349; 428/35; 428/414; 428/516; 428/518; 428/520; 229/87 R
[58] Field of Search ................. 428/35, 520, 516, 522, 428/349, 414, 518; 229/87 R

[56] References Cited

U.S. PATENT DOCUMENTS

| | | | |
|---|---|---|---|
| 4,205,021 | 5/1980 | Morita et al. | 525/240 |
| 4,214,039 | 7/1980 | Steiner et al. | 428/520 |
| 4,447,494 | 5/1984 | Wagner et al. | 428/516 |

*Primary Examiner*—Edith Buffalow
*Attorney, Agent, or Firm*—Alexander J. McKillop; Michael G. Gilman; James P. O'Sullivan, Jr.

[57] ABSTRACT

An oriented multi-layer heat sealable film structure comprising a polyolefin film substrate, a layer of a blend of LLDPE and polypropylene, a primer layer on said blend layer and a heat sealable layer on said primer layer.

9 Claims, No Drawings

ORIENTED MULTI-LAYER HEAT SEALABLE FILM

BACKGROUND OF THE INVENTION

This invention relates to a flexible multilayer heat sealable general purpose packaging film and to a method of forming the same.

In the packaging of certain types of foods, for example, loose products such as cookies, potato chips, and the like, it is common practice to employ a multilayer film having two or more polymeric layers wherein one of the layers is known to be an effective heat seal layer. In the packaging process, a supply of such a multilayer film can be shaped into a tube in a vertical form and fill machine. Marginal regions of the heat seal layer are brought into face to face relationship and heat sealed together. Thereafter, the packaging machine automatically forms a heat seal and makes a horizontal severance across the bottom of the bag; product is dispensed into the open end of the tube and thereafter a second horizontal seal is effected across the tube with a simultaneous severing through the tube to result in a product packaged in a tube, heat sealed at both ends and along one seam at right angles to the end seals. While the food or other product is being dispensed into the package, air is also present in the package and this air assists in protecting and cushioning the product during subsequent shipment of the finished packages. During shipment of the product, particularly with larger size bags, e.g., those containing 16 ounces of product, the bags have a tendency to split or burst at the end seals.

A multilayered wrapping film of the type having the above mentioned utility is described in U.S. Pat. No. 4,214,039, the subject matter of which is, in its entirety, incorporated by reference herein. This patent describes a packaging film structure comprising a polypropylene film substrate having a heat sealable vinylidene chloride polymer containing at least 50% by weight of vinylidene chloride. In between the polypropylene film and the vinylidene chloride polymer is a primer coat which consists of the reaction product of an acidified aminoethylated vinyl polymer and an epoxy resin. This primer coat enhances the bond strength between the polypropylene and the heat sealable vinylidene chloride polymer. While this packaging material is effective for the packaging of comparatively small quantities of product, there exists a need to increase its seal strength when used for the packaging of comparatively large quantities of product. Particularly there is a need to increase the seal strength between the polypropylene layer and the primer layer.

SUMMARY OF THE INVENTION

In accordance with the present invention, an oriented heat sealable multi-layer structure is provided which comprises:

(a) a substrate comprising a polyolefin film;

(b) a layer on at least one surface of (a), said layer consisting essentially of a blend of a linear low density copolymer of ethylene with a minor proportion of a $C_3$-$C_{10}$ alpha olefin and (2) polypropylene;

(c) a primer coating on at least one surface of said layer (b); and (d) a heat sealable layer on said coating (c), said heat sealable layer comprising a member of the group consisting of an acrylic polymer layer and a vinylidene chloride polymer layer.

In preferred forms of the above-identified structure one or both sides of the film can have either an acrylic or a vinylidene chloride polymer heat seal layer thereon. Alternatively, one surface of the film may be a heat sealable acrylic layer while the opposite surface is a heat sealable vinylidene chloride polymer surface.

The method of producing the heat sealable multilayer film structures of the present invention comprises:

coextruding a substrate comprising a polyolefin film with a layer consisting essentially of a blend of (1) a linear low density copolymer of ethylene with a minor proportion of a $C_3$-$C_{10}$ alpha olefin and (2) polypropylene, the coextrusion being on at least one surface of said polyolefin surface;

biaxially orienting the coextrudate;

applying a primer coating to the surface of at least one blend layer; and applying a heat sealable layer on said primer coating, said heat sealable layer comprising a member selected from the group consisting of an acrylic polymer and a vinylidene chloride polymer.

DESCRIPTION OF THE PREFERRED EMBODIMENTS

The polyolefins contemplated as the substrate or core material of the subject film structure include polyethylene, polypropylene, polybutene and copolymers and blends thereof. Particularly preferred is an isotactic polypropylene containing at least 80% by weight of isotatic polypropylene. It is preferred that the polypropylene have a melt flow index of from about 4 to 8 g/10 minutes.

The blends contemplated herein as the layer coextruded with the base polyolefin, in some way not completely understood, functions to increase the overall bond strength formed in ESM seals or crimp seals when employing either acrylic or vinylidene chloride polymer heat seals. The surface layer applied to the core or substrate polypropylene layer is formed from a blend of polypropylene and a linear low density copolymer of ethylene and a $C_3$-$C_{10}$ alpha olefin. The $C_3$-$C_{10}$ alpha olefin is present in the copolymer in a minor amount. Included among the $C_3$-$C_{10}$ olefinic hydrocarbons are propylene, 1-butene, 4-methyl-1-pentene, 1-hexene, 1-octene, 1-decene, etc. Mixtures of such olefinic hydrocarbon monomers also can be employed. These linear low density copolymers are commerically available materials and are manufactured by low pressure processes employing stereospecific catalysts. These materials usually contain from 2-8 wt. %, preferably 2.5-5 wt. %, of the $C_3$-$C_{10}$ alpha olefin hydrocarbon copolymerized with the ethylene, in sufficient amount to give from 5-15 branches per 1,000 carbon atoms in the linear polymer. Manufacturing processes for linear low density polyethylenes of this type are disclosed in U.S. Pat. Nos. 4,076,698 and 4,205,021, the disclosures of which are incorporated herein in their entirety by reference.

The preferred base substrate layer can be homopolypropylene having a melting point range of from about 321°-336° F. A commercially available material of this description is ARCO W472.

In the following examples, the polypropylene employed as the core material and also as the material blended with the linear low density copolymer is identified as an isotactic polypropylene, i.e., ARCO W472 available from ARCO Corp. Its melt flow range is 4-5 and it contains no slip or antiblock additives. The linear low density copolymer employed in the examples is a copolymer of ethylene and 1-octene (LLDPE-C$_8$). The 1-octene is present in the copolymer in approximately 2 to 6 wt. %. A suitable material is Dowlex 2047, available from Dow Chemical, Midland, Mich. It has a melt index of 2.3, and a density of 0.917.

The exterior skin layers are fabricated from a physical blend of one of the above-identified linear low density polyethylene copolymers and polypropylene. The polypropylene employed can be identical to the polypropylene employed for the core layer. The two materials can be blended in a percent by weight of from about 2% by weight to about 100% by weight of the linear low density copolymer with the remainder being the polypropylene. The physical blend can be accomplished by any means which will form a uniform blend of the two components. The components can be premixed as solid dry granules and later melt blended for subsequent extrusion as skin layers on the core material. Alternatively, the material may be melt blended first, cooled and subdivided, and thus, be ready for use as a preformed material.

In preparing the multilayer structure of the present invention, the polyproylene and the copolymer are coextruded so that the copolymer is from about 2 to about 12% of the total thickness of the two layers. For some purposes, a layer of the copolymer can be on both surfaces of a core layer of polypropylene, in which case the two copolymer layers would amount to from 4 to 24% of the total thickness of the three layers. In preparing the coextruded film it has been found advantageous and convenient to recycle certain quantities of scrap extrudate back into the base homopolymer polypropylene. Thus, the homopolymer polypropylene can have from 0 to 25% of reclaimed material interblended therein. This recycle material can contain from 0 to about 15% of the copolymer therein.

It has been found that the heat seal layers contemplated herein do not adhere well to polyolefin film surfaces even when the latter have been subjected to well known pretreatment operations such as, for example, treatment by corona discharge, flame, or oxidizing chemicals. The same has been found to be true in adhering the heat seal layers contemplated herein to the surface of the contemplated copolymer. It has been found, however, that the use of certain primers intermediate between the copolymer and the heat seal layer provides an unexpectedly high level of adherence. As a result, all layers adhere to its adjacent layer with unexpectedly high tenacity.

The system contemplated for the formation of the multi-layer packaging material of the present invention involves the use of three layers applied in succession to the surface of the chosen substrate layer. For example, when the substrate layer is polypropylene, one or both surfaces of the polypropylene film will have applied thereto the following layers progressing in order outwardly from the surface of the polypropylene: A coextruded layer of copolymer, an appropriate primer material to create a bond between the copolymer and a surface heat seal layer, and the heat seal layer itself. Examples of primer materials include those defined in U.K. Pat. No. 1,134,876 which discloses a primer produced by condensing a monoaldehyde with an interpolymer of acrylamide or methacrylamide and at least one other unsaturated monomer; and those defined in U.S. Pat. No. 1,174,328 which discloses a material resulting from condensing aminoaldehyde with acrylamide or methacrylamide and subsequently interpolymerizing the condensation product with at least one other unsaturated monomer in the presence of a $C_1$–$C_6$ alkanol. A preferred primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

A particularly preferred primer material for the acrylic type heat seal layers contemplated herein has been found to be poly(ethyleneimine). The imine primer provides an overall adhesively active surface for thorough and secure bonding with the subsequently applied heat seal composition of this invention. It has been found that an effective coating solution concentration of the poly(ethyleneimine) applied from either aqueous or organic solvent media, such as ethanol is a solution comprising about 0.1–0.6% by weight of the poly(ethyleneimine). A commercially available material of this type is known as Polymin M, a product of BASF-Wyandotte Corp.

Another particularly preferred primer material is the reaction product of an epoxy resin and an acidified amminoethylated vinyl polymer. The contemplated epoxy resins are glycidyl ethers of polyhydroxy compounds. Typical polyhydroxy compounds which may be used include bisphenol A, ring substituted bisphenol A, resorcinol, hydroquinone, phenol-formaldehyde, novolac resins, aliphatic diols, such as ethylene glycol, propylene glycol, 1,4-butanediol, 1,6-hexane-diol, glycerol, lower alkyl hydantoins and mixtures thereof. The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from 170 to 280 may be used in the present invention, but the preferred range is 180 to 210.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in U.S. Pat. No. 3,719,629, the disclosure of which is incorporated herein by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acid to give a -COOH content of about 7.5 to about 12.5%. Solvent polymerization techniques are preferred. The polymer is then reacted with ethyleneimine monomer and acidified with hydrochloric acid to render the polymer water soluble.

In one embodiment of the present invention, a liquid epoxy resin is emulsified in a solution of the curing agent by rapid stirring, the resultant dispersion is diluted with water to the desired concentration for coating, usually from about 2 to about 25% solids. When mixing the epoxy resin with the curing agent, it is generally preferred to use a stochiometric equivalent balance of epoxy and amine groups. However, it has been found that the stochiometric ratio may be varied over a wide range, from about one epoxy to about three amine groups through three epoxy groups to one amine group.

The composition of the heat sealable acrylic interpolymer is that defined in U.S. Pat. No. 3,753,769, the disclosure of which is, in its entirety, incorporated by reference herein. This material consists essentially of an interpolymer of from about 2 to about 15 parts, and preferably from about 2.5 to about 6 parts by weight of acrylic acid, methacrylic acid or any mixture thereof and from about 85 to about 98 parts and preferably from about 94 to about 97.5 parts by weight of neutral monomer esters, said neutral monomer esters preferably comprising (1) methyl acrylate or ethyl acrylate and (2) methyl methacrylate. The interpolymer compositions are further characterized by preferably comprising from about 30% to about 55% by weight of methyl methacrylate when said alkyl acrylate is methyl acrylate, and from about 52.5% to about 69% by weight of methyl methacrylate when said alkyl acrylate is ethyl acrylate. The monomer components of the terpolymer are employed in a ratio such that the alkyl methacrylate monomer is present in an amount of at least 10% by weight of the total terpolymer composition and preferably from about 20 to about 80% by weight, and the alkyl acrylate monomer component in amounts of at least 10% by weight of the total composition, and preferably from about 80 to about 20% by weight.

As indicated above it is contemplated herein that one surface of the structure can be of the above described acrylic heat seal material and the opposite surface can be of a vinylidene chloride polymer heat seal material. Commercially available vinylidene chloride latexes having a vinylidene chloride content of at least 50% and preferably from about 75% to about 92% may be employed. The other ethylenically unsaturated comonomers may include alpha, beta-ethylenically unsaturated acids, such as acrylic and methacrylic acids; alkyl esters containing 1–18 carbon atoms of said acids, such as, methylmethacrylate, ethyl acrylate, butyl acrylate, etc. In addition, alpha, beta-ethylenically unsaturated nitrile such as acrylonitrile and methacrylonitrile can be employed. In addition, monovinyl aromatic compounds such as styrene and vinyl chloride may be employed.

Specific vinylidene polymer latexes contemplated comprise: 82% by weight vinylidene, 14% by weight ethyl acrylate and 4% by weight acrylic acid. Alternatively, a polymer latex comprising about 80% by weight vinylidene chloride, about 17% by weight methylacrylate and about 3% by weight methacrylic acid can likewise be employed. In addition, the heat seal compositions described in U.S. Pat. No. 4,058,649, the disclosure of which is incorporated herein by reference in its entirety, can be employed.

The multiply structure of the present invention can have an overall thickness within a wide range, but it is preferably from about 0.5 up to about 1.75 mils in thickness. When the substrate is the homopolymer polypropylene it can have a film thickness of approximately 1 mil. In this instance, the associated coextruded terpolymer can be present in a thickness of from about 0.02 to about 0.12 mils.

The primer dispersion, to be applied to the surface of the skin layer, can have a solids concentration of from about 0.1% up to about 25%. The primer dispersion can be applied to the surface of the skin layer utilizing standard coating techniques so that a dry coating weight of from about 0.05 up to about 0.25 gram/1,000 square inches of film is obtained. The thus coated film can be subsequently passed through a hot air oven to completely remove water and/or a solvent. Subsequently, this primer coated film can be coated with the appropriate heat seal polymer latex also using standard coating techniques, such as, gravure, roll coating, and the like. The heat seal coated system can thereafter be dried by passing it through a conventional hot air oven.

The amount of acrylic polymer applied to the substrate may be varied over a wide range depending upon the specific properties desired in the final film product. Coating weights of from about 0.3 to about 1.2 grams per 1,000 square inches may be employed. If a 2-sided coated film is desired, optional but beneficial corona treating of the copolymer coated substrate, the priming and the opposite heat seal polymer application can be repeated, either in-line or out-of-line.

In the following examples, the base films are all biaxially oriented by conventional means. In general, this includes forming the base film in sheet form and machine direction orienting (MDO) or stretching the same at the appropriate or optimum temperature, using transport rollers operating at different speeds. After the desired degree of MDO, the film is transverse direction oriented (TDO), for example, in a tentering apparatus, to impart an orientation or stretching which is at right angles to the MDO. The extent of orientation can be from about 3 to about 10 times its original dimension for the MDO and from about 3 to 10 times in the TDO.

For the base film of Example 2, the copolymer can be applied to the propylene film after the polypropylene has been machine direction oriented. In this event, the copolymer will only be transversely oriented while the polypropylene is biaxially oriented. The techniques of U.S. Pat. Nos. 3,620,825 and 3,671,383 (the disclosures of which are incorporated herein in their entirety by reference) can be employed in this respect.

In the following examples the ESM heat seal test is a heat seal test designed to simulate conditions under which films might be sealed in a typical over-wrapping machine. For the test two strips of film are cut, 3 by 14 inches, with the long direction being in the machine direction orientation of pounds per square inch on either side of the film strips for three-quarters of a second, then separated. Testing of the seals is carried as above.

EXAMPLE 1

A biaxially oriented homopolymer isotactic polypropylene film of approximately one mil thickness was coated with the primer reaction product of the acidified aminoethylated vinyl polymer and epoxy resin of example 5 of aforementioned U.S. Pat. No. 4,214,039. The same general coating process of said examples was employed in coating the polypropylene film. The dry coating weight of the primer material was equivalent to about 0.10 grams per 1,000 square inches of film. To the surface of the primer was applied a heat seal layer from an aqueous latex comprising a terpolymer resulting from the polymerization of about 82% by weight of vinylidene chloride, about 14% by weight of ethyl acrylate and about 4% by weight of acrylic acid. The coating was dried to yield a coating weight of approximately 2.6 grams per 1,000 square inches of film.

EXAMPLE 2

Example 1 was repeated except that the primer composition and heat seal compositon was deposited onto the skin surface of a coextruded biaxially oriented composite film of the same polypropylene as in Example 1 and skin layers of a linear low density copolymer of ethylene and 1-octene (Dowlex 2047) blended wih the same polypropylene. The film was 1 mil thick with the skins amounting to 6% of the thickness.

EXAMPLES 3-9

For these examples, Example 2 was repeated except the ratio of linear low density copolymer (LLDPE) to polypropylene (PP) in the skin layer blends were varied as shown in the table below.

ESM and Crimp seals were formed in the multiply structures of Examples 1-9 and the comparative strength of these seals are shown in the following Table.

TABLE

| | Sealability (gm/in.) | |
|---|---|---|
| | Crimp Seals 260° F. | ESM Seals 250-290° F. (AVE.) |
| Example 1 - polypropylene (no skin) | 450 | 452 |
| Example 2 - polypropylene skin 4% LLDPE/96% PP | 505 | 525 |
| Example 3 - polypropylene skin 6% LLDPE/94% PP | 520 | 540 |
| Example 4 - polypropylene skin 8% LLDPE/92% PP | 470 | 548 |
| Example 5 - polypropylene skin 15% LLDPE/85% PP | 563 | 660 |
| Example 6 - polypropylene skin 33% LLDPE/67% PP | 875 | 695 |
| Example 7 - polypropylene skin 67% LLDPE/33% PP | 700 | 810 |
| Example 8 - polypropylene skin 98% LLDPE/2% PP | 620 | 657 |
| Example 9 - polypropylene skin 100% LLDPE/0 | 710 | 730 |

It is clear by the above showing that the heat seal strength of the film structure of Example 2-9 are significantly greater than that of Example 1.

EXAMPLE 10

For this example, Example 2 is repeated except that the coextruded biaxially oriented composite film is coated with a conventional poly(ethyleneimine) primer. To the surface of the primer is applied a heat seal layer from an aqueous solution comprising a terpolymer resulting from the polymerization of about 51% by weight methyl methacrylate, about 45% by weight methyl acrylate and about 4% by weight of methacrylic acid. When the multi-layer film of this Example is tested for the strength of its crimp and ESM seals, as in Examples 1-9, the strengths of the seal of Example 10 will be seen to be significantly greater than that of Example 1.

It has been determined that after the application of the primer layer and the heat seal layer it is advantageous to permit the structure to age for a certain minimum period of time in order to obtain the outstanding high heat seal bond that results from the present invention. Optimum aging can be accomplished over a period of time ranging from about 25 hours to about 21 days while maintaining the film at a temperature ranging from about 32°-150° F.

Although the present invention has been described with preferred embodiments, it is to be understood that modifications and variations may be resorted to without departing from the spirit and scope of this invention. Such variations and modifications are considered to within the purview and scope of the appended claims.

What is claimed is:

1. A heat sealable multi-layer structure comprising:
   (a) a substrate comprising a polyolefin film;
   (b) a layer on at least one surface of (a), said layer consisting essentially of a blend of (1) a linear low density copolymer of ethylene with a minor proportion of a $C_3$-$C_{10}$ alpha olefin (LLDPE) and (2) polypropylene;
   (c) a primer coating between layers (b) and (d) on at least one of said layer (b); and
   (d) a heat sealable layer on said coating (c) said heat sealable layer being a member selected from the group consisting of a vinylidene chloride polymer and an acrylic polymer.

2. The structure of claim 1 wherein said polyolefin film comprises homopolymer polypropylene interblended with from 0 to about 15 parts by weight of said blend.

3. The structure of claim 2 wherein said primer comprises a member selected from the group consisting of poly(ethyleneimine); the reaction product of an acidified aminoethylated vinyl polymer and an epoxy resin; the condensation product of a monoaldehyde with an interpolymer of acrylamide or methacrylamide and at least one other unsaturated monomer; and the condensation product of aminoaldehyde with acrylamide or methacrylamide interpolymerized with at least one other unsaturated monomer in the presence of a $C_1$-$C_6$ alkanol.

4. The structure of claim 3 wherein said coextruded layer (b) is on one surface of substrate (a).

5. The structure of claim 3 wherein said coextruded layer is on both surfaces of substrate (a).

6. The structure of claim 1 wherein said heat sealable layer comprises a vinylidene chloride copolymer containing at least 50% by weight of vinylidene chloride.

7. The structure of claim 1 wherein said heat sealable layer comprises an interpolymer of (a) a minor amount by weight of acrylic acid, methacrylic acid or mixtures thereof and (b) a major amount of neutral monomer esters comprising (1) methyl acrylate or ethyl acrylate and (2) methyl methacrylate.

8. The structure of claim 1 wherein said heat sealable acrylic polymer is on one surface of the structure and said heat sealable vinylidene chloride polymer is on the opposite surface of said structure.

9. The structure of claim 1 wherein said blend contains from about 2-100% of said LLDPE and from 98-0% of said polypropylene.

* * * * *